United States Patent
Moorman

(10) Patent No.: US 12,122,287 B1
(45) Date of Patent: Oct. 22, 2024

(54) LOW-PROFILE LED HEADLIGHT HAVING A STROBE AND HEADLIGHT ASSEMBLY

(71) Applicant: Buyers Products Company, Mentor, OH (US)

(72) Inventor: Scott Moorman, Concord Township, OH (US)

(73) Assignee: Buyers Products Company, Mentor, OH (US)

(*) Notice: Subject to any disclaimer, the term of this patent is extended or adjusted under 35 U.S.C. 154(b) by 0 days.

(21) Appl. No.: 18/504,250

(22) Filed: Nov. 8, 2023

(51) Int. Cl.
*B60Q 1/46* (2006.01)
*B60Q 1/04* (2006.01)
*B60Q 1/14* (2006.01)
*F21S 41/14* (2018.01)
*F21S 41/663* (2018.01)

(52) U.S. Cl.
CPC ......... *B60Q 1/0433* (2013.01); *B60Q 1/0483* (2013.01); *B60Q 1/1415* (2013.01); *B60Q 1/46* (2013.01); *F21S 41/18* (2018.01); *F21S 41/663* (2018.01); *B60Q 2300/05* (2013.01)

(58) Field of Classification Search
CPC .................................. B60Q 1/46; F21S 41/18
See application file for complete search history.

(56) References Cited

U.S. PATENT DOCUMENTS

| | | | |
|---|---|---|---|
| 5,510,763 A | 4/1996 | Deckard et al. | |
| 6,181,243 B1 | 1/2001 | Yang | |
| 6,323,766 B1 | 11/2001 | Bartlett et al. | |
| 6,515,584 B2 | 2/2003 | DeYoung | |
| 6,842,111 B1 | 1/2005 | Smithson | |
| 7,347,597 B2 * | 3/2008 | French ..................... | B60D 1/62 362/540 |
| 11,135,968 B2 | 10/2021 | Cobb et al. | |
| 2005/0099286 A1 | 5/2005 | DeYoung | |
| 2009/0045754 A1 | 2/2009 | Jozwik | |

* cited by examiner

*Primary Examiner* — Robert J May
(74) *Attorney, Agent, or Firm* — Emerson, Thomson & Bennett, LLC; Roger D. Emerson; Matt J. Wilson

(57) ABSTRACT

This disclosure is of an inventive low-profile LED headlight apparatus having an elongate light box and a headlight assembly that are synchronized with an integral strobe light assembly, which can be illuminated in a coordinated flash pattern. The headlight assembly has at least one addressable headlight lamp. The strobe light assembly has at least one addressable strobe light. These patterns can include alternating, patterned, or synchronized flash patterns. While strobe/warning lights are commonly incorporated into vehicles as distinct units, integrating them into plow headlights can eliminate the need for separate installation, in addition to allowing for more than one set of flashing lights. This apparatus also includes a controller, in electrical communication with the headlight assembly, and a selectively engageable port on one of the sides of the elongate light box for exhausting atmosphere within the elongate light box.

20 Claims, 7 Drawing Sheets

LOW-PROFILE LED HEADLIGHT HAVING A STROBE AND HEADLIGHT ASSEMBLY

I. BACKGROUND

A. Technical Field

Figure 1:
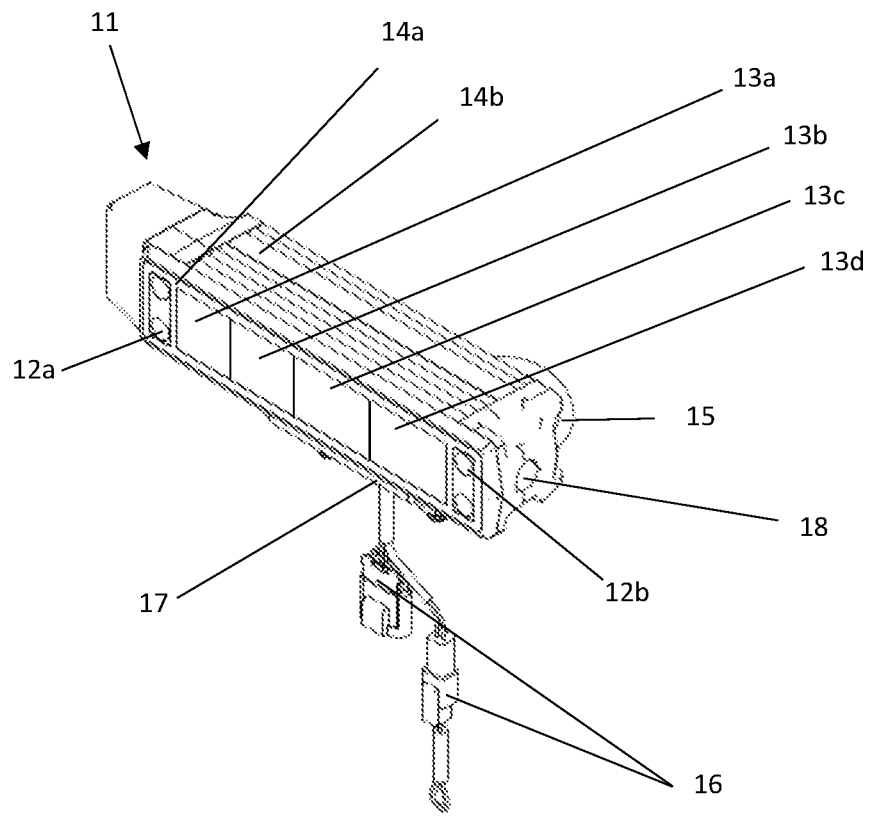

The present invention generally pertains to the art of snowplow lights. The present invention specifically relates to auxiliary snowplow lights.

B. Description of Related Art

Auxiliary devices, such as plows, are quick and effective tools to clear snow, mud, or debris. However, to safely operate an auxiliary device, a user must be aware of its path, especially when used in darkness. Illumination helps provide this awareness and makes it easier for the user to determine a path that has fewer obstacles or obstructions.

Strobe/warning and light-emitting diode (LED) lights are already commonly utilized with vehicles and plows as separate units to provide or bolster illumination. However, integrating these types of lights into snowplow lights to act as a controlled unit eliminates the need for a separate installation and allows for one more set of flashing lights.

Accordingly, the unmet and ongoing need for an auxiliary snowplow light connected to an auxiliary device, such as a plow, a snowplow, a sweeper, has inspired multiple designs aimed at synchronizing the use of an auxiliary component with an additional auxiliary headlight apparatus. Several concepts have attempted to fill this need, which will now be discussed.

In one concept disclosed in U.S. Pat. No. 11,135,968, a hazard beacon with an interface to a vehicle wiring harness was invented. This hazard beacon included emergency or hazard lights, which allowed for greater visual direction and concurrently conferred amplified safety and visibility. However, this hazard beacon did not encase all the hazard lights internally within a single box.

In another concept disclosed in U.S. Pat. App. Publication 2022/0289100, a vehicle lighting system adapted for use on a motor vehicle with an auxiliary device assembled on the motor vehicle was invented. This vehicle lighting system included a first lighting system on the motor vehicle and a second lighting system with a plurality of different lights. This second lighting system was located on an auxiliary device. In addition, a control circuit controlled the different lights of the second lighting system for an operating sequence of the lights from the first lighting system. However, this reference had the first lighting system located on a body of the motor vehicle, as opposed to an auxiliary device. In the field of auxiliary devices, such as plows, this lighting system may be obstructed by such auxiliary devices.

In yet another concept disclosed in U.S. Pat. No. 11,644,182, an apparatus for marking an implement, such as a snowplow, provides additional illumination beyond the standard headlights of a vehicle. In addition, a mounting bracket helped connect this apparatus with the snowplow. However, this reference only marked the implement, as opposed to illuminating the path of the implement.

Beyond these disclosed concepts, as vehicles become more sophisticated, directly connecting auxiliary lights into the vehicle lighting system can cause electrical problems. For example, when auxiliary snowplow lights connect to a vehicle's lighting system, the vehicle's computer may detect a change in the lighting system; thus, this change may create an error or fault in the vehicle's lighting system. Moreover, connecting the vehicle's lighting system with separate conductor wires and connectors can be complicated, hazardous, and time-consuming.

With these deficiencies in the prior art, this present invention's disclosure overcomes the problem of auxiliary devices obstructing the headlights of a controlling vehicle. With this understanding, this present invention alleviates these obstruction concerns, as these systems would create an additional source of light while not being obstructed by the auxiliary device.

Thus, to limit separate installation and to allow for greater illumination for auxiliary devices, the following apparatus is disclosed. Embodiments in the present invention are directed at improvements to the current state of the art.

II. BRIEF SUMMARY OF THE INVENTION

Presented in this disclosure is an apparatus for providing an additional source of light for an auxiliary device, such as a plow. The apparatus includes several components that, when used together, overcome the inadequacies of the prior art.

In accordance with one aspect of the present invention, the auxiliary snowplow light is an apparatus with an elongate light box. Juxtaposing this with the prior art, unlike the concept disclosed in U.S. Pat. No. 11,135,968, the present invention is three dimensional and encloses internal lights, which helps protect the lights. In terms of structure, the elongate light box has at least one side and at least a front face. This front face carries at least one headlight assembly and a strobe light assembly. The headlight assembly comprises at least one addressable headlight lamp. Thus, the headlight assembly could be disposed on a distal end, a proximal end, or on both ends of the apparatus. The headlight assembly could have standard settings for high beams, low beams, parking lights, and turn signals. The headlight assembly would provide improved visual communication signals for bystanders that may be in the auxiliary device's clearing path.

Furthermore, the apparatus includes a strobe light assembly having at least one addressable strobe light. In accordance with still another aspect of the present invention, the headlight assembly is integrated with the strobe light assembly in a coordinated flash pattern, either synchronized, alternating, or patterned pattern. By way of example, the synchronized pattern would be one where the headlight assembly illuminates simultaneously with the at least one addressable strobe light in the strobe light assembly. Additionally, the alternating pattern could be where the headlight assembly illuminates first and then the strobe light assembly illuminates second (or vice versa). Finally, the patterned pattern could be a sequence where the headlight assembly illuminates once, then the strobe light assembly illuminates twice, then the pattern repeats.

The apparatus is powered. A controller is in electrical communication to the strobe light assembly for selectively addressing operation of the headlight assembly and the at least one addressable strobe light of the strobe light assembly. Electrical communication can be via a wire or a cable. To provide synchronized illumination, the controller also could have different settings for illumination, including: a high-beam setting, a low-beam setting, and a parking-light setting. In some embodiments, the controller can be external to the headlight or strobe light assembly. However, in other embodiments, the controller can be housed inside the headlight assembly. In other exemplary embodiments, the controller can be housed in the strobe light assembly.

In accordance with yet another aspect of the present invention, the headlight assembly could be independently powered with a source of electrical energy, such as a battery. In other cases, the apparatus may utilize a detachable tether, which could charge the source of electrical energy. In those cases, the detachable tether is not required to be connected to the vehicle or the headlight assembly during operation. Regardless, this source of electrical energy would be sufficient to illuminate the headlight assembly and the strobe light assembly in any one of the disclosed coordinated flash patterns.

In accordance with yet another aspect of the present invention, a mounting mechanism can connect the elongate light box to an auxiliary device, such as a plow. The mounting mechanism could have holes on a proximal end, a distal end, or both ends of the apparatus. Additionally, exemplary mechanisms may include mechanical implements, such as bolts, nuts, pins, and/or washers. In addition, the mounting mechanism could include a mounting bracket having a mounting surface, wherein the mounting surface is configured for connecting to the apparatus so that the apparatus is ultimately disposed in a horizontal or a vertical position.

Still other benefits and advantages of the invention will become apparent to those skilled in the art to which it pertains upon a reading and understanding of the following detailed specification.

In accordance with yet another aspect of the present invention, the apparatus includes a selectively engageable port in one of the elongate light box's sides for exhausting the atmosphere trapped within the elongate light box. During use, the atmosphere in the elongate light box would be warmer than the atmosphere outside the elongate light box due to the illumination of the headlight assembly and at least one addressable strobe light.

III. BRIEF DESCRIPTION OF THE DRAWINGS

Figure 2:
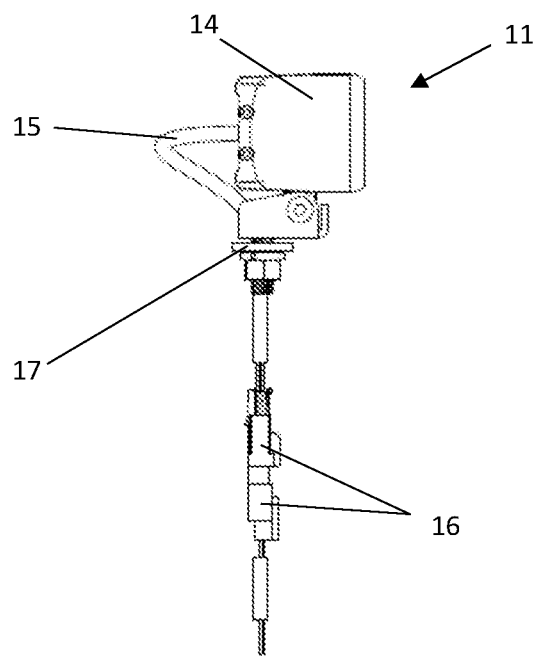
Figure 3:
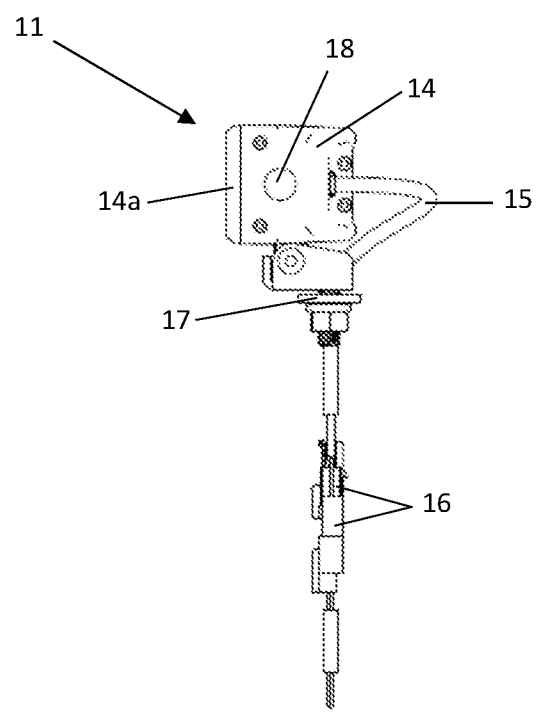
Figure 4:
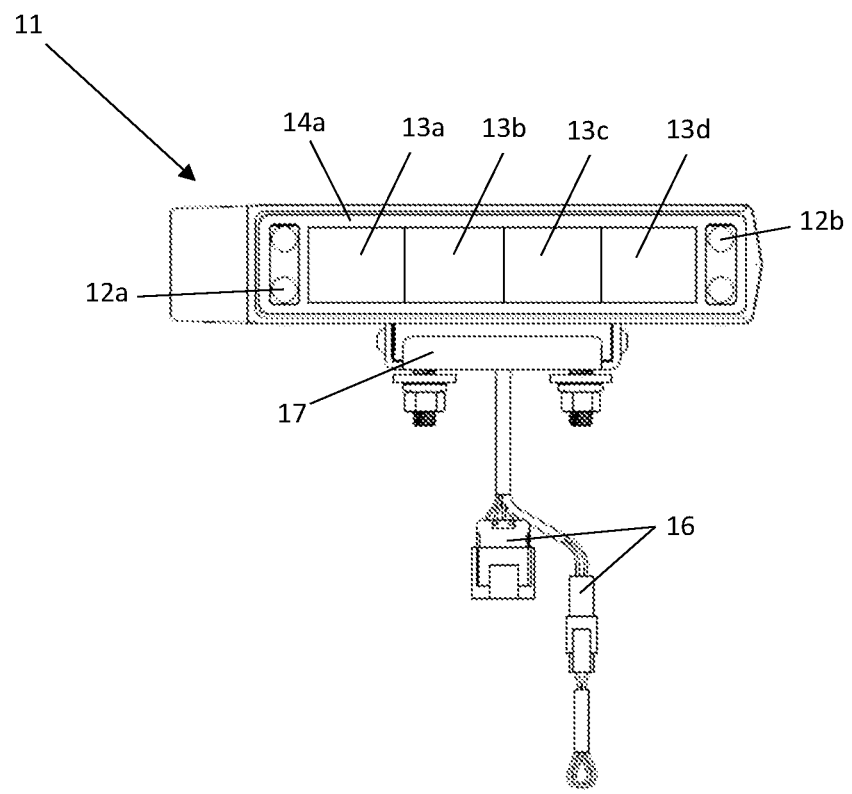
Figure 5:
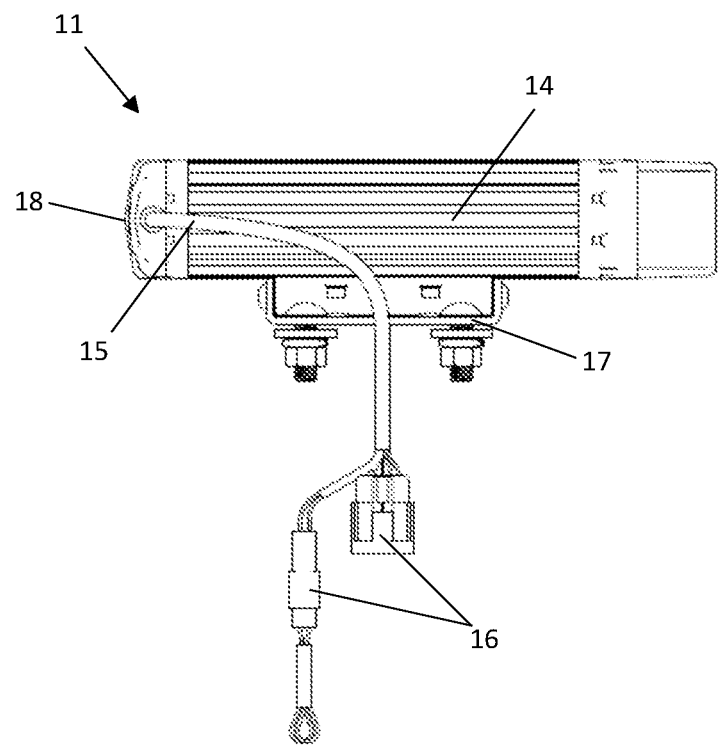
Figure 6:
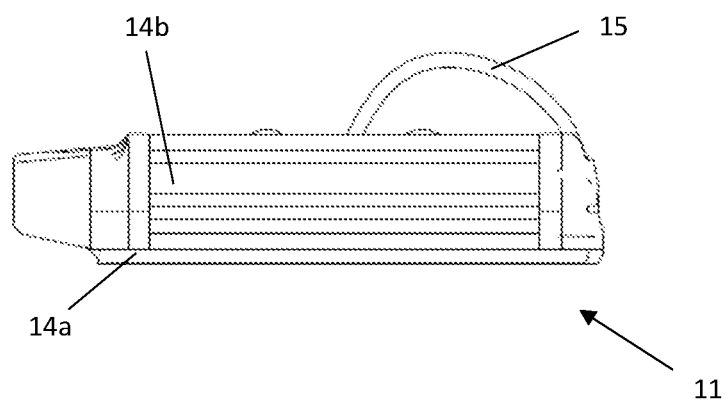
Figure 7:
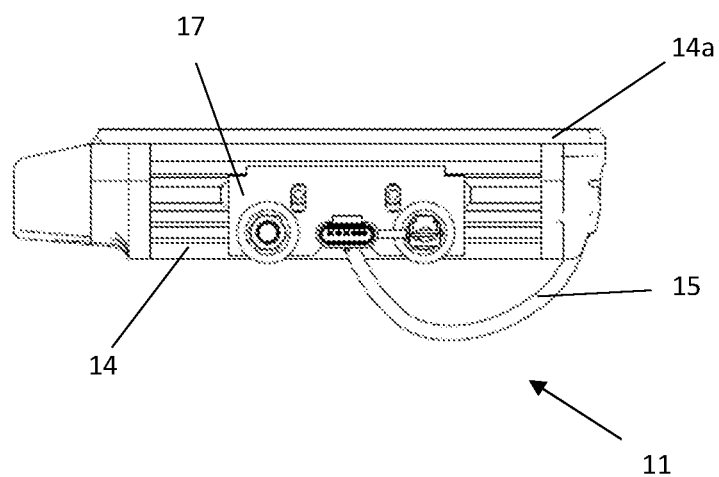

The invention may take physical form in certain parts and arrangement of parts, embodiments of which will be described in detail in this specification and illustrated in the accompanying drawings, which form a part hereof and wherein:

FIG. 1 is an isometric view of the apparatus.
FIG. 2 is a right-side view of the apparatus.
FIG. 3 is a left-side view of the apparatus.
FIG. 4 is a front view of the apparatus.
FIG. 5 is a rear view of the apparatus.
FIG. 6 is a top view of the apparatus.
FIG. 7 is a bottom view of the apparatus.

IV. DETAILED DESCRIPTION OF THE INVENTION

Referring now to the drawings wherein the showings are for purposes of illustrating embodiments of the invention only and not for purposes of limiting the same, and wherein like reference numerals are understood to refer to like components.

FIG. 1 shows a standard plow headlight apparatus 11 according to some embodiments of this invention. While the apparatus 11 shown can be mounted to auxiliary devices, such as plows, it should be understood that auxiliary devices could be any type of mountable auxiliary device used by skilled artisans and may have non-auxiliary applications as well. This apparatus 11 comprises: a headlight assembly 12, comprising an addressable headlight lamp 12a and an addressable headlight lamp 12b; a strobe light assembly 13 comprising, collectively, an addressable strobe light 13a, an addressable strobe light 13b, an addressable strobe light 13c, and an addressable strobe light 13d; an elongate light box 14 comprising a front face 14a and a side 14b; an electrical communication 15, a controller 16; a mounting mechanism 17, and a selectively engageable port 18.

The headlight assembly 12 may be on either side or both sides of the front face 14a of the elongate light box 14. In addition, the integral strobe light assembly 13 could be disposed between the addressable headlight lamps 12a and 12b.

The headlight assembly 12, comprising the at least one addressable headlight lamp 12a, and the integral strobe light assembly 13, comprising the at least one strobe light 13a, is controlled by the controller 16, which would provide for a coordinated flash pattern between the headlight assembly 12 and the integral strobe light assembly 13.

FIG. 2 is a right-side view of the apparatus 11 shown in FIG. 1. The apparatus 11 includes the elongate light box 14, which is shown with the electrical communication 15, the controller 16, and the mounting mechanism 17.

FIG. 3 is a left-side view of the apparatus 11 shown in FIG. 1. The apparatus 11 is shown, including the elongate light box 14 comprising the front face 14a. Furthermore, the elongate light box 14 is shown with the electrical communication 15, the controller 16, the mounting mechanism 17, and the selectively engageable port 18.

FIG. 4 is a front view of the apparatus 11 shown in FIG. 1. The apparatus 11 is shown, including the mounting bracket 17 disposed below the headlight assembly 12, comprising the addressable headlight lamps 12a and 12b and the strobe light assembly 13. In addition, the controller 16 is below the mounting bracket 17.

FIG. 5 is a rear view of the apparatus 11 shown in FIG. 1. The apparatus 11 is shown, including the elongate light box 14, the electrical communication 15, the controller 16, the mounting bracket 17, and the selectively engageable port 18.

FIG. 6 is a top view of the apparatus 11 shown in FIG. 1. The apparatus 11 is shown, including the elongate light box 14, the front face 14a, and the electrical communication 15.

FIG. 7 is a bottom view of the apparatus 11 shown in FIG. 1. The apparatus 11 is shown, including the elongate light box 14, the front face 14a, the electrical communication 15, and the mounting mechanism 17.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

The invention claimed is:

1. An apparatus for providing a source of light for an auxiliary device, comprising:
   an elongate light box comprising at least a side and at least a front face, wherein the front face carrying a headlight assembly and a strobe light assembly, wherein the headlight assembly and the strobe light assembly are adjacent,
   the headlight assembly comprising at least one addressable headlight lamp,
   the strobe light assembly comprising at least one addressable strobe light,
   a controller in electrical communication to the strobe light assembly for selectively addressing operation of at least one addressable headlight lamp of the headlight assembly and the at least one addressable strobe light of the strobe light assembly; and a selectively engageable port in one of the sides of the elongate light box for exhausting atmosphere within the elongate light box.

2. An apparatus, as in claim 1, the apparatus further comprising a mounting mechanism, wherein the mounting mechanism is connected to at least one side of the elongate light box.

3. An apparatus, as in claim 1, wherein the controller controls the rate of illumination for the headlight assembly and the strobe light assembly.

4. An apparatus, as in claim 1, wherein the headlight assembly has a high-beam setting.

5. An apparatus, as in claim 1, wherein the headlight assembly has a low-beam setting.

6. An apparatus, as in claim 1, wherein the mounting mechanism utilizes bolts.

7. An apparatus, as in claim 1, wherein the mounting mechanism has a hole on a distal end of the apparatus.

8. An apparatus, as in claim 1, wherein the mounting mechanism has a hole on a proximal end of the apparatus.

9. An apparatus, as in claim 1, wherein the mounting mechanism has a hole on the proximal end and the distal end of the apparatus.

10. An apparatus, as in claim 1, wherein the mounting mechanism has a mounting bracket.

11. An apparatus for providing a source of light for an auxiliary device, comprising:

an elongate light box comprises at least a side and at least a front face, wherein the front face carries a headlight assembly and a strobe light assembly; wherein the headlight assembly and the strobe light assembly are adjacent, the headlight assembly comprising two addressable headlight lamps, the strobe light assembly comprising four addressable strobe lights that are adjacent to each other;

a controller in electrical communication to the strobe light assembly for selectively addressing operation of at least one addressable headlight lamp of the headlight assembly and the at least one addressable strobe light of the strobe light assembly; and a selectively engageable port in one of the sides of the elongate light box for exhausting atmosphere within the elongate light box.

12. An apparatus, as in claim 11, the apparatus further comprising a mounting mechanism, wherein the mounting mechanism is connected to at least one side of the elongate light box.

13. An apparatus, as in claim 11, wherein the controller controls the rate of illumination for the headlight assembly and the strobe light assembly.

14. An apparatus, as in claim 11, wherein the controller is inside the strobe light assembly.

15. An apparatus, as in claim 11, wherein the controller is inside the headlight light assembly.

16. An apparatus, as in claim 11, wherein the mounting mechanism utilizes bolts.

17. An apparatus, as in claim 11, wherein the mounting mechanism has a hole on a distal end of the apparatus.

18. An apparatus, as in claim 11, wherein the mounting mechanism has a hole on a proximal end of the apparatus.

19. An apparatus, as in claim 11, wherein the mounting mechanism has a hole on the proximal end and the distal end of the apparatus.

20. An apparatus, as in claim 11, wherein the mounting mechanism has a mounting bracket.

* * * * *